(12) United States Patent
McNicol et al.

(10) Patent No.: US 9,124,371 B2
(45) Date of Patent: Sep. 1, 2015

(54) APPARATUS TO CONTROL CARRIER SPACING IN A MULTI-CARRIER OPTICAL TRANSMITTER

(75) Inventors: John D. McNicol, Ottawa (CA); Michael Francis Van Leeuwen, Bethesda, MD (US); Pierre Mertz, Baltimore, MD (US); Hai Xu, North Laurel, MD (US)

(73) Assignee: Infinera Corporation, Sunnyvale, CA (US)

( * ) Notice: Subject to any disclaimer, the term of this patent is extended or adjusted under 35 U.S.C. 154(b) by 642 days.

(21) Appl. No.: 13/078,890

(22) Filed: Apr. 1, 2011

(65) Prior Publication Data

US 2012/0251101 A1    Oct. 4, 2012

(51) Int. Cl.
*H04B 10/572*    (2013.01)
*H04B 10/50*    (2013.01)
*H04J 14/02*    (2006.01)

(52) U.S. Cl.
CPC ............ *H04B 10/506* (2013.01); *H04B 10/572* (2013.01); *H04J 14/02* (2013.01)

(58) Field of Classification Search
CPC .................................................... H04B 10/506
USPC ........................................................ 398/95
See application file for complete search history.

(56) References Cited

U.S. PATENT DOCUMENTS

| | | | |
|---|---|---|---|
| 2003/0011841 A1* | 1/2003 | Lee ................................ | 359/124 |
| 2003/0030876 A1* | 2/2003 | Takei ............................ | 359/187 |
| 2003/0123496 A1* | 7/2003 | Broutin et al. .................. | 372/20 |
| 2004/0114149 A1* | 6/2004 | Einstein et al. ............... | 356/484 |
| 2006/0002438 A1* | 1/2006 | Brown ............................. | 372/32 |
| 2009/0022495 A1* | 1/2009 | Welch et al. ..................... | 398/79 |
| 2009/0296751 A1* | 12/2009 | Kewitsch et al. ............... | 372/18 |

* cited by examiner

*Primary Examiner* — Shi K Li
(74) *Attorney, Agent, or Firm* — David L. Soltz

(57) ABSTRACT

Consistent with the present disclosure, data, in digital form, is received by a transmit node of an optical communication system, and is then provided to a modulator that, in turn, modulates light, received from an optical source at one of a plurality of periodically and preferably minimally spaced wavelengths. The plurality of periodically spaced wavelengths or carriers are grouped together with minimal carrier spacing, to form a superchannel. The carrier spacing between adjacent carriers is determined by detecting a beat frequency of a combined optical signal that includes the outputs of two adjacent optical sources. The beat frequency corresponds to a frequency difference between the outputs of the adjacent carriers. This frequency difference should correspond to a desired carrier spacing between each of the plurality of carriers. A frequency error between the beat frequency and the desired carrier spacing is then measured by down-converting the beat frequency with respect to a target reference frequency corresponding to the desired carrier frequency spacing. Based on the determined frequency error, the optical sources are controlled to adjust in frequency to minimize or reduce the frequency error to zero. For every pair of adjacent carriers, the corresponding outputs of the optical sources are compared in the above manner to determine a plurality of frequency errors. Each optical source can thus be tuned in order to realize a precise carrier spacing between each of the adjacent carriers.

7 Claims, 12 Drawing Sheets

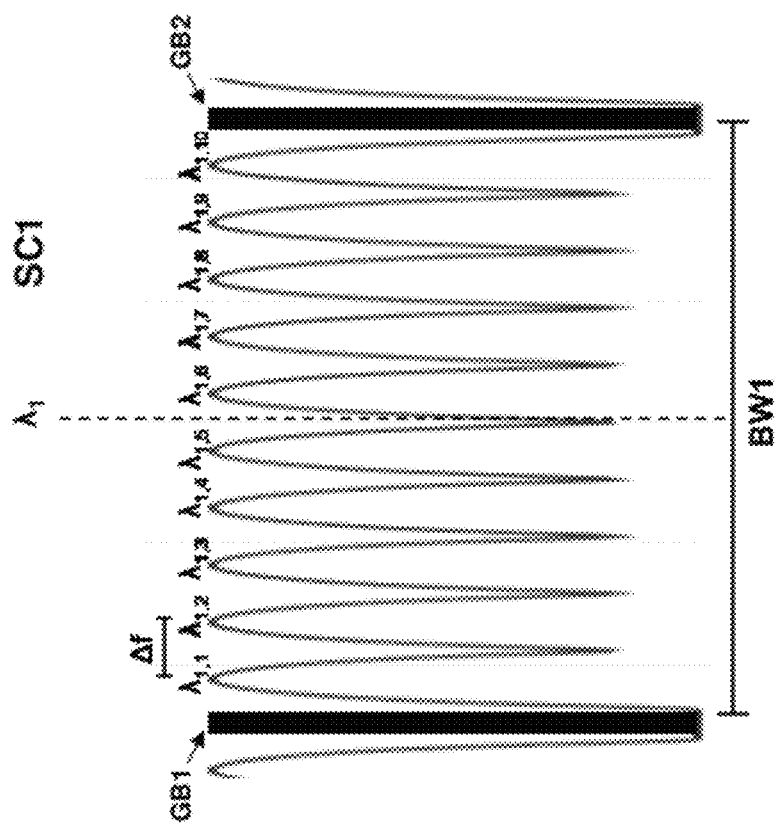

APPARATUS TO CONTROL CARRIER SPACING IN A MULTI-CARRIER OPTICAL TRANSMITTER

BACKGROUND OF THE DISCLOSURE

Wavelength division multiplexed (WDM) optical communication systems are known in which multiple optical signals or channels, each having a different wavelength, are combined onto an optical fiber. Such systems typically include a laser associated with each wavelength, a modulator configured to modulate the optical signal output from the laser, and an optical combiner to combine each of the modulated optical signals. Such components are typically provided at a transmit end of the WDM optical communication system to transmit the optical signals onto the optical fiber. At a receive end of the WDM optical communication system, the optical signals are often separated and converted to corresponding electrical signals that are then processed further.

Known WDM optical communication systems are capable of multiplexing 40 channels at 100 GHz spacing or 80 channels at 50 GHz spacing. These WDM optical communication systems occupy an overall bandwidth of 4000 GHz. At 50 GHz channel spacing and 100 GHz channel spacing, the occupied optical fiber bandwidth or spectrum is not efficiently used. As rapid growth of the Internet continues, and new applications arise, there is an increasing demand for higher data rates provided by underlying networks, which may be supported by advances in optical communication systems. Due to the increased demand, the information carrying capacity of an optical fiber preferably should also increase. As used herein, the terms "carrier", "channel", and "optical signal" may be used interchangeably.

One method to increase the data capacity of the occupied optical fiber bandwidth is to employ higher data rate modulation formats to modulate the optical signals or channels to carry data at higher rates. Such higher rate modulation formats, however, are typically more susceptible to noise, and, therefore, may not be used in transmission of optical signals over relatively long distances. Thus, the modulation format must be chosen according to a desired reach, or distance, the transmitted channels are expected to span. Other known systems, commonly called dense wavelength-division multiplexing systems (DWDM), are capable of packing even more densely, additional channels on an optical fiber by more closely spacing the channels together, such as at 25 GHz spacing between channels. While 25 GHz channel spacing is an improvement over 50 GHz and 100 GHz spacing, further improvement is still needed to meet the demands of increased data rates.

Conventional DWDM systems for optical communications typically conform to a wavelength or frequency grid defined by the International Telecommunications Union (ITU). The most common frequency grid is that used for channel spacing at wavelengths around 1550 nm as defined by ITU-T G.694.1 (2002). The ITU grid is defined relative to 193.1 THz and extends from 191.7 THz to 196.1 THz with 100 GHz periodic spacing between adjacent channels. Recently, however, as optical technology has improved, the grid has practically been extended to cover 186 THz to 201 THz and is subdivided to provide the 50 GHz and 25 GHz spaced channels discussed above. Because the ITU grid is an accepted standard, many optical components used in known optical communication systems have been developed and optimized to conform to the ITU defined frequency channels and their periodic spacing. However, conforming to such a restrictive frequency grid, while convenient, may undesirably limit the data carrying capacity of an optical communication system.

Preferably, the information carrying capacity of an optical communication system should be optimized to carry a maximum amount of data over a maximum length of optical fiber while efficiently utilizing the bandwidth supported by available optical components, such as optical amplifiers, for example. Accordingly, individual carrier or channel spacing should be minimized according to the available optical components and transmitter and receiver technology capable of reliably transmitting and receiving such minimally spaced channels. Such minimum spacing may be less than 25 GHz, for example, and is preferably only slightly larger than the symbol rate of the modulation applied to each carrier. Therefore, the frequency difference between adjacent carriers is minimal and a greater number of channels or signals can be packed in a given bandwidth, resulting in more efficient use of network resources and the occupied optical spectrum of the channels. Accordingly, increased data demands of the network drive a need to provide a plurality of minimally spaced carriers to increase optical communication system network capacity.

The wavelength of an optical signal or carrier, however, can vary with temperature. Unless the wavelength of each optical signal is controlled, the wavelengths of the optical signals may drift and could equal one another, such that the optical signals interfere with one another. Alternatively, if wavelength changes vary significantly, the optical signal may not be filtered or demultiplexed at a receive end of the optical communication system. Wavelength control may be particularly difficult when the wavelengths are tightly or minimally spaced, such as when the optical signals collectively constitute a "superchannel."

One known optical component that is commonly used to control optical signal wavelengths is a Fabry-Perot (FP) etalon, which may be used as a frequency discriminator to align an optical signal frequency or carrier frequency with one or more frequencies (i.e., a frequency "grid") specified by a standard, such as the International Telecommunications Union (ITU). It is known that FP etalons exhibit periodic optical transmission characteristics, and that FP etalons are characterized by a free spectral range (FSR), or the distance in optical frequency between a pair of adjacent peaks in the transmission spectrum of the FP etalon. In known systems, an FP etalon is chosen with a FSR that matches the fixed frequency or channel spacing defined by the ITU grid, for example. However, in such systems the carrier spacing is typically 100 GHz, as discussed above. FP etalons have been developed with a FSR of 50 GHz or less, but to realize such an FP etalon, the physical thickness of the optical component is typically too large to be satisfactorily implemented. Additionally, FP etalons exhibit frequency errors. If such errors are small relative to the channel spacing, FP etalons may be used for wavelength control. However, if the carrier frequency spacing or carrier spacing is small, the frequency errors are a significant fraction of the carrier spacing. Accordingly, FPs may not be used to control wavelengths in systems having a narrow channel spacing, such as systems that transmit superchannels. As such, an improved method and apparatus for precisely locking the frequency or wavelength of an optical signal output from a laser, for example, is needed.

SUMMARY OF THE DISCLOSURE

Consistent with one aspect of the present disclosure, an apparatus includes a first optical source configured to supply a first optical signal having a first frequency and a second optical source configured to supply a second optical signal having a second frequency, the first and second optical signals being provided as ones of a plurality of optical signals. Also included is a locking circuit configured to determine a frequency difference between the first and second frequencies, and to supply a control signal indicative of a difference between the frequency difference and a predetermined frequency spacing. The apparatus also includes a tuning circuit configured to adjust at least one of the first and second frequencies in response to the control signal.

Consistent with another aspect of the present disclosure, a method combines a first optical signal having a first frequency with a second optical signal having a second frequency, the first and second optical signals being ones of a plurality of optical signals grouped together as a channel. The method then determines a first frequency difference between the first and second frequencies and a second frequency difference between the first difference and a reference frequency. Then it is determined whether to adjust one or both of the first and second optical sources according to the second frequency difference. Then the method adjusts at least one of the first and second frequencies based on the determined second frequency difference.

Consistent with another aspect of the present disclosure, an apparatus is provided including N optical sources configured to supply N corresponding optical signals having N respective frequencies, wherein the N optical signals form a superchannel, where N is an integer greater than 1. Also included are N−1 locking circuits configured to determine N−1 respective differences in frequency between adjacent optical signals output from corresponding N−1 pairs of the N optical sources. Also provided are N tuning circuits corresponding to N respective optical sources, each configured to adjust an output of the corresponding optical source according to the N−1 respective determined first frequency differences.

Consistent with another aspect of the present disclosure, an apparatus includes a first laser having a first end and a second end, the first end supplying first light and the second end supplying second light, the first and second lights having a first frequency, and a second laser having first and second ends, the first end of the second laser supplying third light and the second end of the second laser supplying fourth light, the third and fourth lights having a second frequency. The apparatus includes an optical combiner configured to combine the second and fourth lights and supply a combined signal, the combined signal having an associated beat frequency indicative of a difference between the first and second frequencies. A locking circuit configured to supply a control signal indicative of a difference between a predetermined frequency spacing and the difference between the first and second frequencies is also provided. Additionally, the apparatus includes a tuning circuit configured to adjust at least one of the first and second frequencies. A first optical splitter having first and second outputs is provided, the first optical splitter being configured to receive the first light and supply a first portion of the first light from the first output and a second portion of the first light from the second output. Also provided is a second optical splitter having first and second outputs, the second optical splitter configured to receive the second light and supply a first portion of the second light from the first output of the second optical splitter and a second portion of the second light from the second output of the second optical splitter. An optical combiner is configured to combine the first portions of the first and second lights and supply a combined signal, the combined signal having an associated beat frequency indicative of a difference between the first and second frequencies. A locking circuit is configured to supply a control signal indicative of a difference between a predetermined frequency spacing and the difference between the first and second frequencies. Also provided is a tuning circuit configured to adjust at least one of the first and second frequencies.

Consistent with another aspect of the present disclosure, an apparatus includes a first laser supplying first light, the first light having a first frequency, and second laser supplying second light, the second light having a second frequency.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIG. 1b illustrates an optical signal or superchannel transmitted in an optical communication system consistent with aspects of the present disclosure;

DESCRIPTION OF THE EMBODIMENTS

Figure 1A:
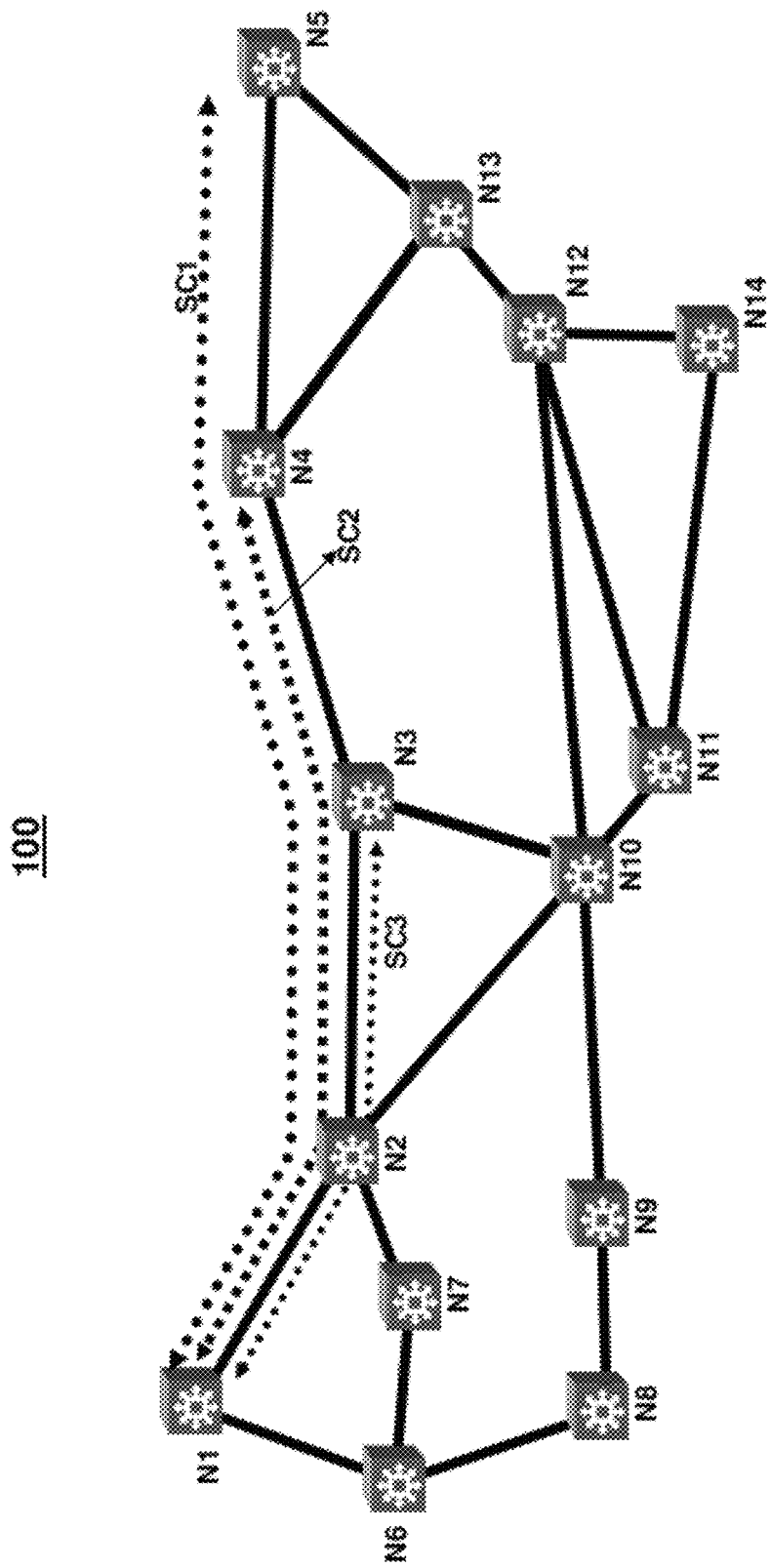
FIG. 1a illustrates an optical communication system consistent with aspects of the present disclosure.

Consistent with the present disclosure, data, in digital form, is received by a transmit node of an optical communication system. In response to the received data, a modulator modulates light output from a laser to provide a modulated optical signal. Typically, a plurality of such modulators and lasers are provided, and each of the corresponding modulated optical signals or carriers has a respective one of a plurality of wavelengths. The wavelengths are spectrally spaced from one another in a uniform manner, and may thus be considered periodic. Preferably, the optical signals have wavelengths that are minimally spaced from one another, such that the optical signals collectively constitute a superchannel. In one example, a plurality of superchannels may be transmitted in an optical communication system.

In order to control the wavelength or frequency of each optical signal in the superchannel, optical signal frequencies or wavelengths may be locked or controlled relative to each other. Namely, light output from one laser (a first laser output) is combined with light having an adjacent wavelength that is output from another laser (a second laser output) to generate a beat signal having an associated beat frequency. The beat frequency corresponds to a frequency difference between the frequency of the first laser output and the frequency of the second laser output. Preferably, the beat frequency corresponds to the desired spacing between the first and second laser output frequencies. If the beat frequency deviates from the desired frequency spacing, the frequencies of one or both of the first and second laser outputs has changed and a frequency error may be generated. The frequency error may be generated by down-converting the beat frequency with respect to a target reference frequency corresponding to the desired carrier frequency spacing.

Based on the determined frequency error, the first and second laser output frequencies may be controlled or adjusted to minimize or reduce the frequency error to zero. Such frequency or wavelength control may similarly be performed based on a frequency error associated with each pair of lasers. As a result, each carrier wavelength of the superchannel can be precisely controlled to be properly spaced from one another, such that optical signals do not interfere with one another and can be accurately detected at a receive end.

It is common and understood that optical signals can be described in terms of their transmitted frequency or wavelength. Throughout this disclosure, both of these terms may be used to describe the same signal or characteristic of a signal. For example, in FIG. 1b, a plurality of carriers are identified by their wavelength, whereas the spacing between the individual carriers is described with respect to frequency.

Reference will now be made in detail to the present exemplary embodiments of the present disclosure, which are illustrated in the accompanying drawings. Wherever possible, the same reference numbers will be used throughout the drawings to refer to the same or like parts.

An optical communication system 100 is shown in FIG. 1a. As shown, the optical communication system 100 comprises a plurality of interconnected nodes N1 to N14 that may span across the United States, for example. Each node, e.g., N1 to N14, may enable high capacity WDM optical transport and digital add/drop flexibility for multiplexing a plurality of optical signals traversing the optical communication system 100. Optical signals are preferably grouped according to a plurality of superchannels SC1, SC2, and SC3, for example. Each node N1 to N14 preferably implements one or more of the exemplary systems and methods discussed below to transmit and receive superchannels, SC1, SC2, and SC3, in the optical communication system 100. Optical communication system 100 can be implemented by deploying nodes, N1 to N14, anywhere in the network where access is desired. Some nodes may even be implemented, such as shown with respect to node N2 in FIG. 1a, to simply route or pass one or more superchannels, SC1, SC2, and SC3, to other nodes in the network without processing the mean data that is carried by the superchannels. Some exemplary systems and methods implemented in nodes, N1 to N14, are further discussed below.

Figure 2:
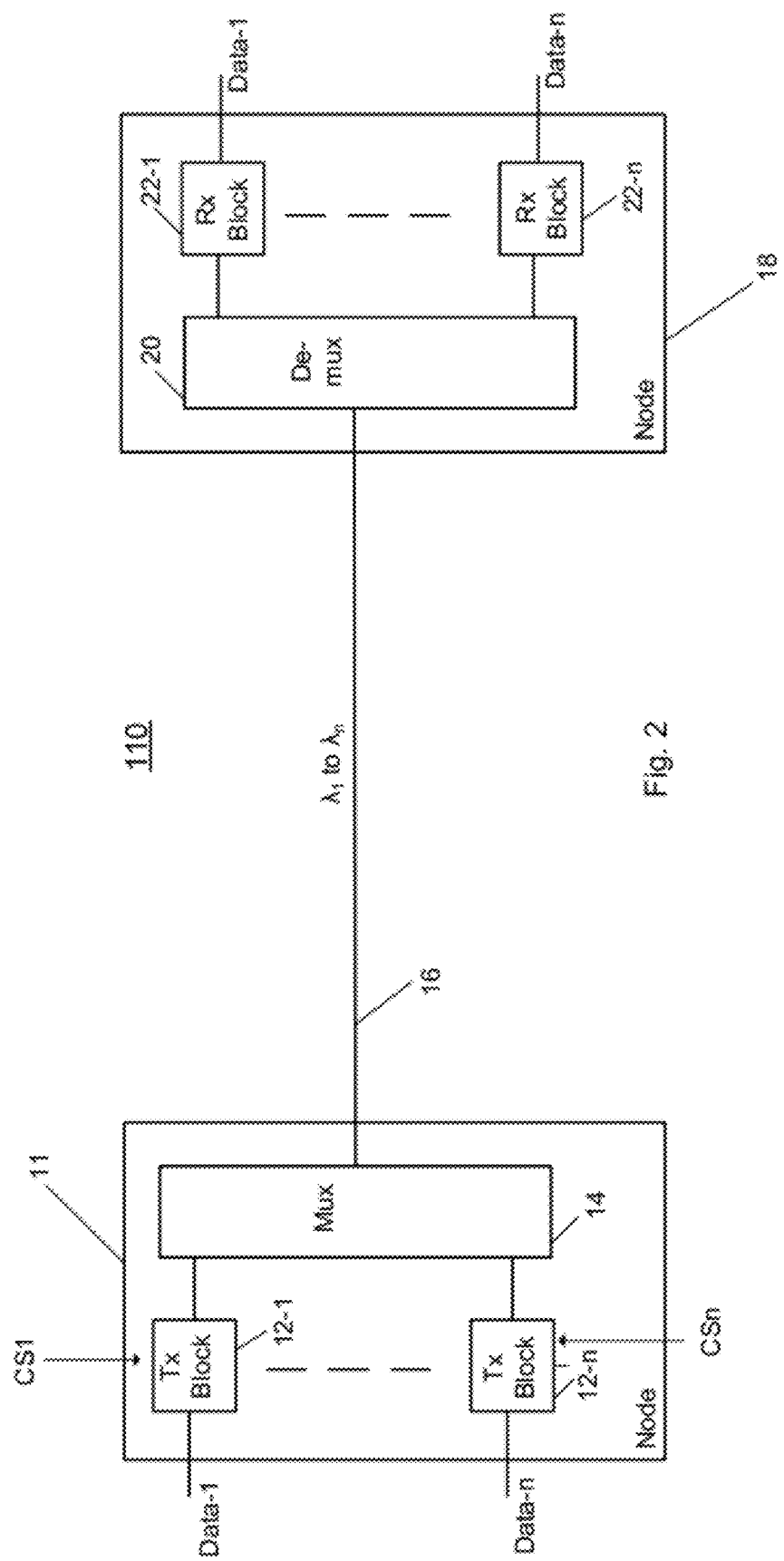
FIG. 2 illustrates an optical link consistent with aspects of the present disclosure.

FIG. 2 illustrates an optical link 110 provided between a transmit node 11 and a receive node 18, such as nodes N1 and N2 for example, as part of a optical communication system 100 consistent with an aspect of the present disclosure. Optical Node N1 may include a plurality of transmitter blocks (Tx Block) 12-1 to 12-n. The same or similar transmitter blocks may also be provided in any of remaining nodes N2 to N14. Each of transmitter blocks 12-1 to 12-n receives a corresponding one of a plurality of data or information streams, Data-1 to Data-n, and, in response to a respective one of these data streams, each of transmitter blocks 12-1 to 12-n outputs a group or band of optical signals or carriers to a combiner or multiplexer 14. Accordingly, in the exemplary embodiment, each transmitter block 12-1 to 12-n outputs a superchannel comprising a band of a plurality of sub-wavelength channels or optical carriers as shown in FIG. 1b. Each superchannel carries an information stream or data corresponding to each of data streams Data-1 to Data-n, respectively.

The optical signals or carriers included in each group or band are may be centered around a wavelength or frequency specified by the ITU wavelength or frequency grid. Alternatively, each of the optical carriers is provided according to a unique nonstandard grid that is optimized for a specific embodiment. For example, a plurality of optical signals or carriers $\lambda 1,1$ to $\lambda 1,10$ are grouped or banded together to form a superchannel SC1. Each carrier $\lambda 1,1$ to $\lambda 1,10$ of SC1 may be considered a sub-wavelength channel banded around the center wavelength $\lambda 1$ identifying the superchannel SC1. As shown, in an exemplary embodiment, the plurality of sub-wavelength channels $\lambda 1,1$ to $\lambda 1,10$ are minimally spaced so as to optimize the occupied bandwidth BW1 of the superchannel SC1. As described above, superchannel SC1 may be independently routed through the digital optical network 100 or multiplexed with a plurality of other superchannels as shown in FIG. 1a. In one embodiment, the superchannels are combined together with a fixed spectral spacing or guard band (GB1 and GB2 shown in FIG. 1b) between the adjacent superchannels that enables reliable demultiplexing of the combined superchannels at a receive node N2 (in this example) using an optical demultiplexer 20.

In an exemplary embodiment, carriers $\lambda 1,1$ to $\lambda 1,10$ are preferably periodically spaced from each other by a fixed frequency spacing according to an embodiment specific unique frequency grid. In other words, as shown in FIG. 1b, a corresponding frequency spacing between the center wavelengths $\lambda 1,1$ and $\lambda 1,2$, shown as $\Delta f$, is the same for each of the other carriers in a superchannel. Thus, each of the carriers are said to be periodically spaced from each other by $\Delta f$. In the exemplary embodiments, the individual carriers are preferably minimally spaced apart from each other. Each carrier has an associated bandwidth that is substantially the same as a baud rate or symbol rate of the carrier. In the exemplary embodiments, for example, $\Delta f$ is preferably close to the baud rate or is greater than the baud rate by a small percentage of the baud rate, such as 10 percent or less of the baud rate. For example, in one embodiment, the baud rate or symbol rate of data carried by each of the carriers may be 16 GHz, thus the carrier spacing in such an embodiment is preferably 17.5 GHz. As generally understood, each optical signal may carry data as a series of symbols, and, as noted above, the transmission of such symbols has an associated baud or symbol rate.

It is understood, as further described below, that the characteristics of optical components, such as a DFB laser and an arrayed waveguide, can vary with respect to temperature and other environmental conditions. Thus, throughout the disclosure where a "fixed" frequency or wavelength spacing is described, such fixed spacing is a theoretical or ideal fixed spacing that is desired, but may not be achieved exactly due to environmental conditions. Thus, any substantially similar spacing, frequency or wavelength within expected optical component variations may correspond to the ideal fixed spacing described.

There are several techniques for assigning wavelengths in a superchannel in accordance with a symbol rate or a modulation format (e.g., binary phase shift keying (BPSK), quadrature phase shift keying (QPSK), and m-quadrature amplitude modulation (m-QAM, where m is an integer)) to achieve desired performance and to meet unique data capacity or bandwidth requirements, each of which may be utilized in accordance with the present disclosure. Some examples of such techniques are described in greater detail in U.S. patent application titled "Periodic Superchannel Carrier Arrangement for Digital Optical Networks", by John McNicol, application Ser. No. 13/078,895 filed Apr. 1, 2011, and separate U.S. patent applications titled "Multiplexer and Modulation Arrangements for Multi-Carrier Optical Modems", application Ser. Nos. 13/078,888 and 13/078,893, respectively, both by John McNicol and both filed Apr. 1, 2011, the entire contents of each of which are incorporated herein by reference.

Referring back to FIG. 2, a multiplexer 14, which in accordance with this embodiment includes one or more optical filters or broadband combiners, for example, combines each of the groups of optical signals or superchannels onto optical communication path 16. Optical communication path 16 includes one or more segments of optical fiber and optical amplifiers, for example, to optically amplify or boost the power of the transmitted optical signals. As shown, a receive node N2 includes a demultiplexer 20 for demultiplexing the received superchannels. According to one embodiment, demultiplexer 20 at the receive node N2 may include one or more optical filters, for example. Optical demultiplexer 20 supplies each superchannel or group of received optical signals to a corresponding one of receiver blocks (Rx Blocks) 22-1 to 22-n. Each of receiver blocks 22-1 to 22-n, in turn, supplies a corresponding copy of data or information streams Data-1 to Data-n in response to the optical signals. It is understood that each of transmitter blocks 12-1 to 12-n has the same or similar structure and each of receiver blocks 22-1 to 22-n has the same or similar structure.

Figure 3:
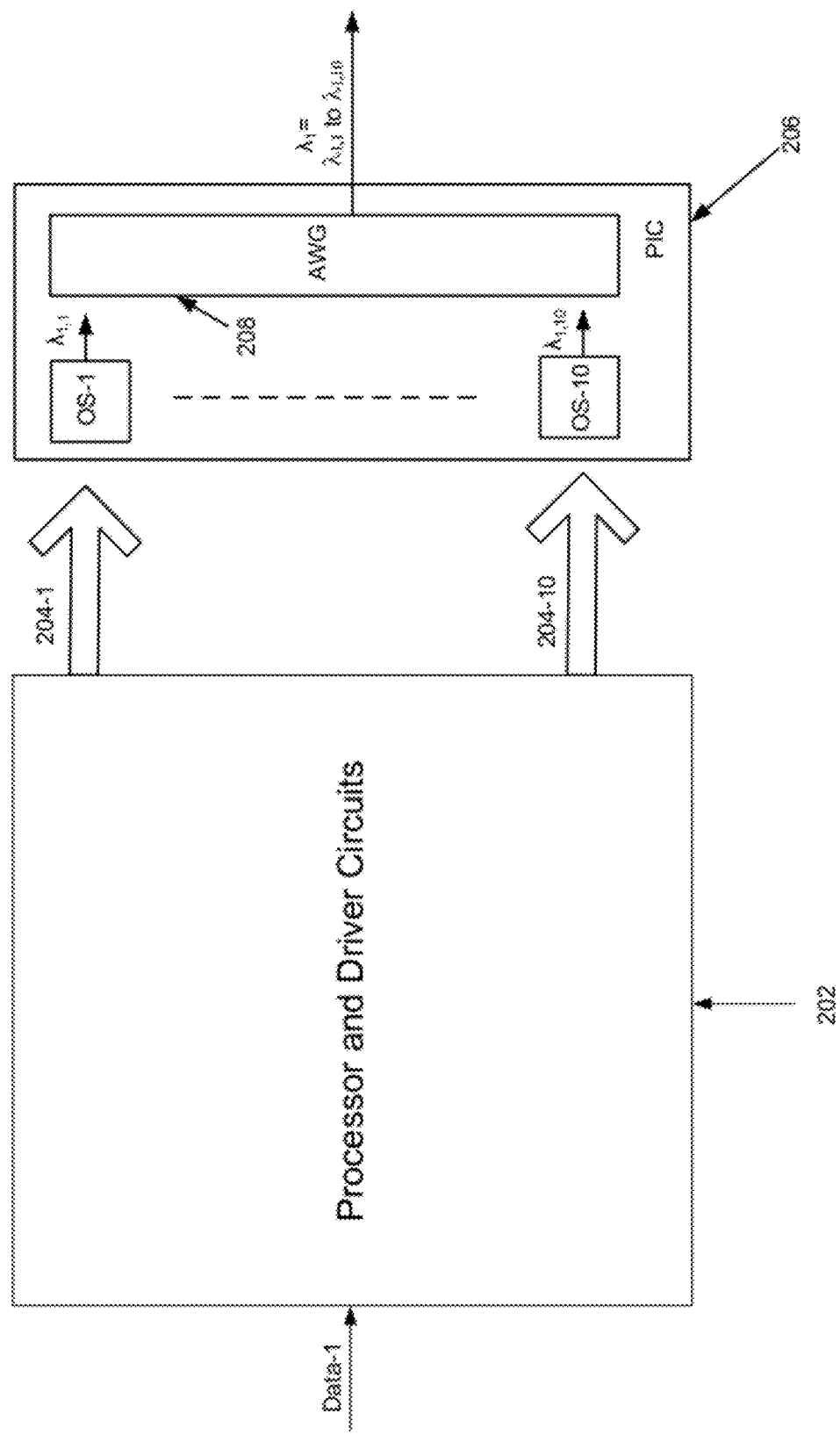
FIG. 3 illustrates various portions of a transmitter block consistent with an additional aspect of the present disclosure.

FIG. 3 illustrates one of transmitter blocks 12-1 in greater detail. It is understood that remaining transmitter blocks 12-2 to 12-n have the same or similar structure as transmitter block 12-1. Transmitter block 12-1 includes a processing circuitry block 204 that includes a digital signal processor (DSP) and an application specific integrated circuitry (ASIC), for example, for processing incoming Data-1 and supplying corresponding outputs or electrical signals 204-1 to 204-10 to optical sources or transmitters OS-1 to OS-10 provided on a transmit photonic integrated circuit (PIC) 206. Some of the functionality of processing circuitry block 204 includes sampling and filtering of the incoming digital data Data-1 and spectral shaping of the data, as well as conversion of the digital data signals into analog signals utilizing known digital-to-analog converter circuitry, for example. Processing circuitry block 204 also provides modulator driver signals that have a desired current and/or voltage for driving modulators present in PIC 206, as discussed in greater detail below with reference to FIG. 4.

As further shown in FIG. 3, based on signals 204-1 to 204-10 each of optical sources OS-1 to OS-10 supplies a corresponding one of modulated sub-wavelength optical signals or carriers having wavelengths $\lambda1,1$ to $\lambda1,10$, respectively. As discussed further below with respect to FIG. 4, in one embodiment, the modulated sub-wavelength optical signals output from OS-1 to OS-10 are polarization multiplexed. The polarization multiplexed optical signals may then be combined by a broadband combiner or a wavelength multiplexer 208, such as an arrayed waveguide grating (AWG), for example, into a band or group of optical signals comprising a superchannel represented by $\lambda1$ supplied by output 206-1, see also FIG. 1b.

Although FIG. 3 illustrates ten optical sources OS-1 to OS-10, it is understood that any appropriate number of such optical sources may be provided. For example, the appropriate number of optical sources may be determined according to the number of sub-wavelength carriers utilized for a chosen optical bandwidth or desired capacity according to a specific embodiment. Additionally, as shown in FIG. 3, optical sources OS-1 to OS-10 and multiplexer 208 are provided on a substrate 205, for example. Substrate 205 may include indium phosphide or other semiconductor materials. Moreover, it is understood, that optical sources OS-1 to OS-10, as well as multiplexer 208, may be provided as discrete components, as opposed to being integrated onto substrate 205 as PIC 206. Alternatively, selected components may be provided on a first substrate while others may be provided on one or more additional substrates in a hybrid scheme in which the components are neither integrated onto one substrate nor provided as discrete devices.

Additional and detailed functionality and configuration of the transmit node 11 and receive node N2 is described further in U.S. patent application Ser. No. 12/897,784, titled "Wavelength Division Multiplexed Optical Communication System Having Variable Channel Spacings", filed Oct. 5, 2010, and in U.S. patent application Ser. No. 12/981,835, titled "Method and Apparatus For Local Optimization of an Optical Transmitter", filed Dec. 30, 2010, the entire contents of each of which are incorporated herein by reference.

Figure 4:
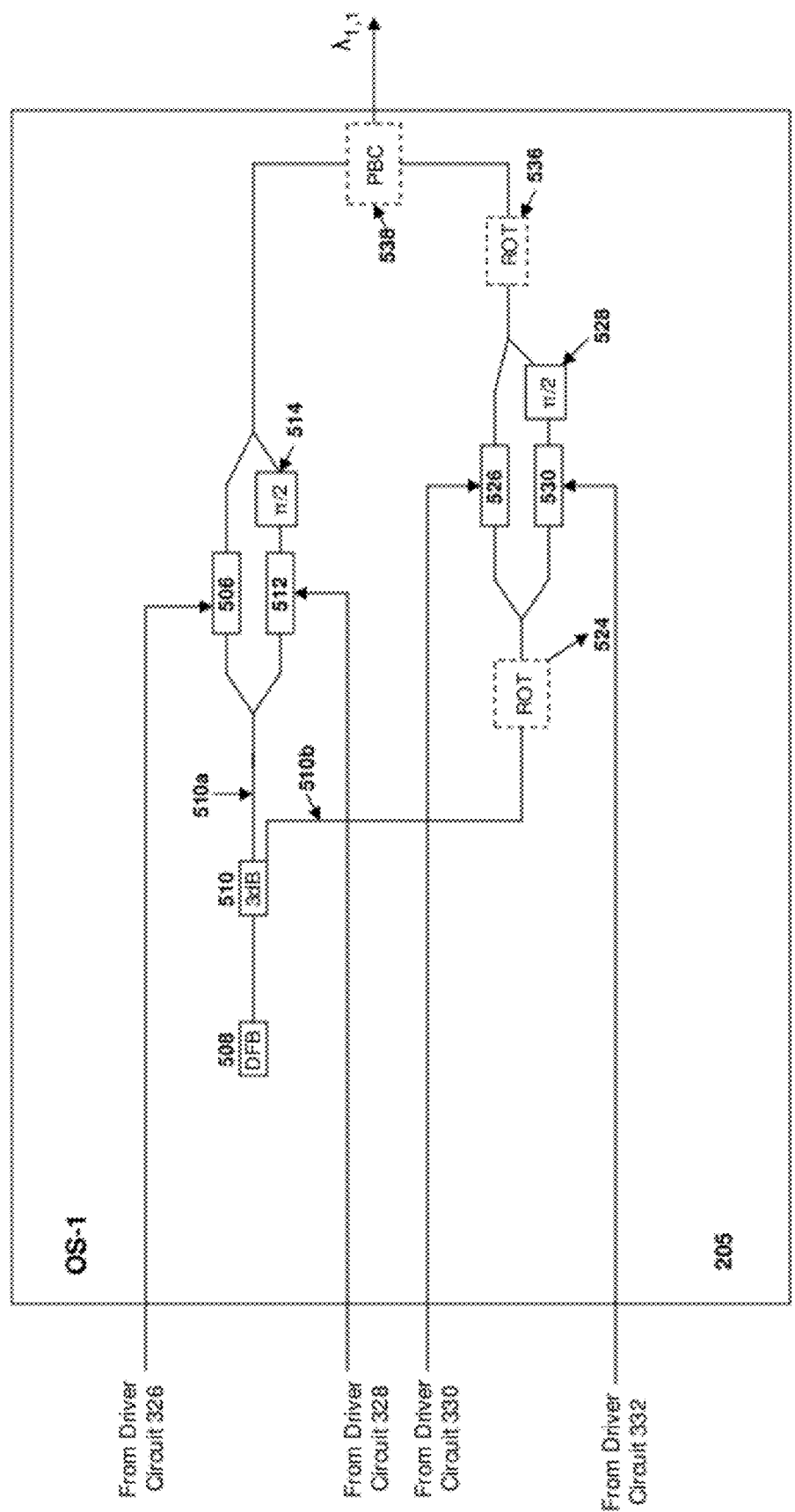
FIG. 4 illustrates a portion of a transmit photonic integrated circuit (PIC) consistent with the present disclosure.

FIG. 4 illustrates an optical source OS-1 in greater detail. It is understood that remaining optical sources OS-2 to OS-10 have the same or similar structure as optical source OS-1.

Optical source OS-1 may be provided on substrate 205 and may include a laser 508, such as a distributed feedback laser (DFB) that supplies light to at least four (4) modulators 506, 512, 526 and 530. DFB 508 may output continuous wave (CW) light at wavelength $\lambda1,1$ to a dual output splitter or coupler 510 (e.g. a 3 db coupler) having an input port and first and second output ports 510a and 510b. Typically, the various components of optical source OS-1 are connected using waveguides that may be polarization dependent. A first output 510a of coupler 510 supplies the CW light to modulator 506 and modulator 512. Similarly, the second output 510b is coupled to modulator 526 and modulator 530. Modulators 506, 512, 526 and 530 may be, for example, Mach Zender (MZ) modulators. Each of the MZ modulators receives CW light from DFB 508 and splits the light between two (2) arms or paths. An applied electric field in one or both paths of a MZ modulator creates a change in the refractive index such that a phase of light output from the MZ modulator is shifted or changed relative to light input to the MZ modulator. Thus, appropriate changes in the electric field based on drive signals provided in the electrical signals 204-1 can cause the desired changes in phase of the light output from the respective MZ modulators. In accordance with a desired embodiment, modulators 506, 512, 526 and 530 are controlled to modulate the incoming light from DFB 508 according to a plurality of modulation formats such as polarization multiplexed phase shift keyed (PM-QPSK), and other quadrature amplitude modulation (QAM) formats, such as PM-8QAM, PM-16QAM or PM-32QAM.

The modulated optical signal from MZ modulator 512 is supplied to phase shifter 514 which shifts the phase of the signal 90° ($\pi/2$) to generate one of an in-phase (I) or quadrature (Q) components. The signal output from phase shifter 514 is combined with the modulated data signals from MZ modulator 506, which includes the other of the I and Q components. Similarly, MZ modulator 526 outputs modulated optical signals as one of the I and Q components, whereas MZ modulator 530 outputs the other of the I and Q components from phase shifter 528 which shifts the phase of the incoming signal 90° ($\pi/2$). A polarization rotator 524 may optionally be disposed between coupler 510 and modulators 526, 530. Polarization rotator 524 may be a two port device that rotates the polarization of light propagating through the device by a particular angle, usually an odd multiple of 90°. Alternatively, polarization rotator 536 may be disposed at the combined output of modulators 526, 530 as shown. In that case, the polarization rotator 536 rotates both the modulated signals from MZ modulators 526 and 530 rather than the CW signal from DFB 508 before modulation.

In one embodiment, such as that shown in FIG. 3 for example, the combined modulated data signal from MZ modulators 526 and 530 are supplied to an input of a polarization beam combiner (PBC) 538, which combines or polarization multiplexes the two modulated signals from MZ modulators 526 and 530 with the other two modulated signals from MZ modulators 506 and 512, and outputs a polarization multiplexed optical signal having wavelength $\lambda 1,1$. In this manner, one DFB laser 508 may provide a CW signal to four separate MZ modulators 506, 512, 526 and 530 for modulating the sub-wavelength channel by utilizing phase shifting and polarization rotation of the transmission signals. Alternatively, multiple CW light sources may be used for each modulator which may increase device complexity, chip real estate, power requirements and associated manufacturing costs. The polarization multiplexed output from PBC 538, may be supplied to multiplexer or AWG 208 in FIG. 3, along with the polarization multiplexed outputs having wavelength $\lambda 1,2$ to $\lambda 1,n$ from remaining optical sources OS-2 to OS-n. Multiplexer 208, which, as noted above, may include an AWG, supplies a group of optical signals to multiplexer 14 (see FIG. 2).

The present disclosure is not limited to the above embodiment, additional functionality and alternative embodiments of OS-1 consistent with the present disclosure are further described in the above incorporated U.S. patent application Ser. Nos. 12/897,784 and 12/981,835.

The above embodiment, in which PIC 206 includes a plurality of optical sources OS-1 to OS-n provided on a substrate 205, enables an optical communication system that carries a superchannel with minimally spaced sub-wavelength carriers $\lambda 1,1$ to $\lambda 1,10$ as described above. The number of carriers for each superchannel may vary according to a specific embodiment, as determined by the optical bandwidth of the superchannel, for example, yet it is preferred that the spacing between each carrier is optimized regardless of the number of carriers. Maintaining optimum or minimum spacing between each of the carriers depends in part on the wavelength stability of the DFB lasers 508, for example, provided for each optical source OS-n in providing the desired frequency or wavelength output. It is understood that environmental conditions, particularly changes in temperature, can seriously affect the stability of a DFB laser 508. Because the plurality of DFB lasers 508 are provided together on a PIC 206 as part of each optical source OS-n, the environmental conditions for each optical source OS-n can be tightly controlled. However, the output of one or more of the lasers 508 may be susceptible to drift over time or may be subject to some environmental condition that causes the laser to output a signal of a slightly different frequency than that desired. In an embodiment according to this disclosure, where a plurality of carriers are tightly spaced, any such subtle changes in a laser's output may cause a shift in the entire spectrum of the superchannel resulting in difficulties in recovering each of the individual carriers. Thus, frequency errors between a plurality of DFB lasers 508 should be reliably eliminated or reduced such that the plurality of DFB lasers 508 can precisely operate substantially at the desired closely spaced sub-wavelengths for optimizing the bandwidth of the superchannel.

Figure 5A:
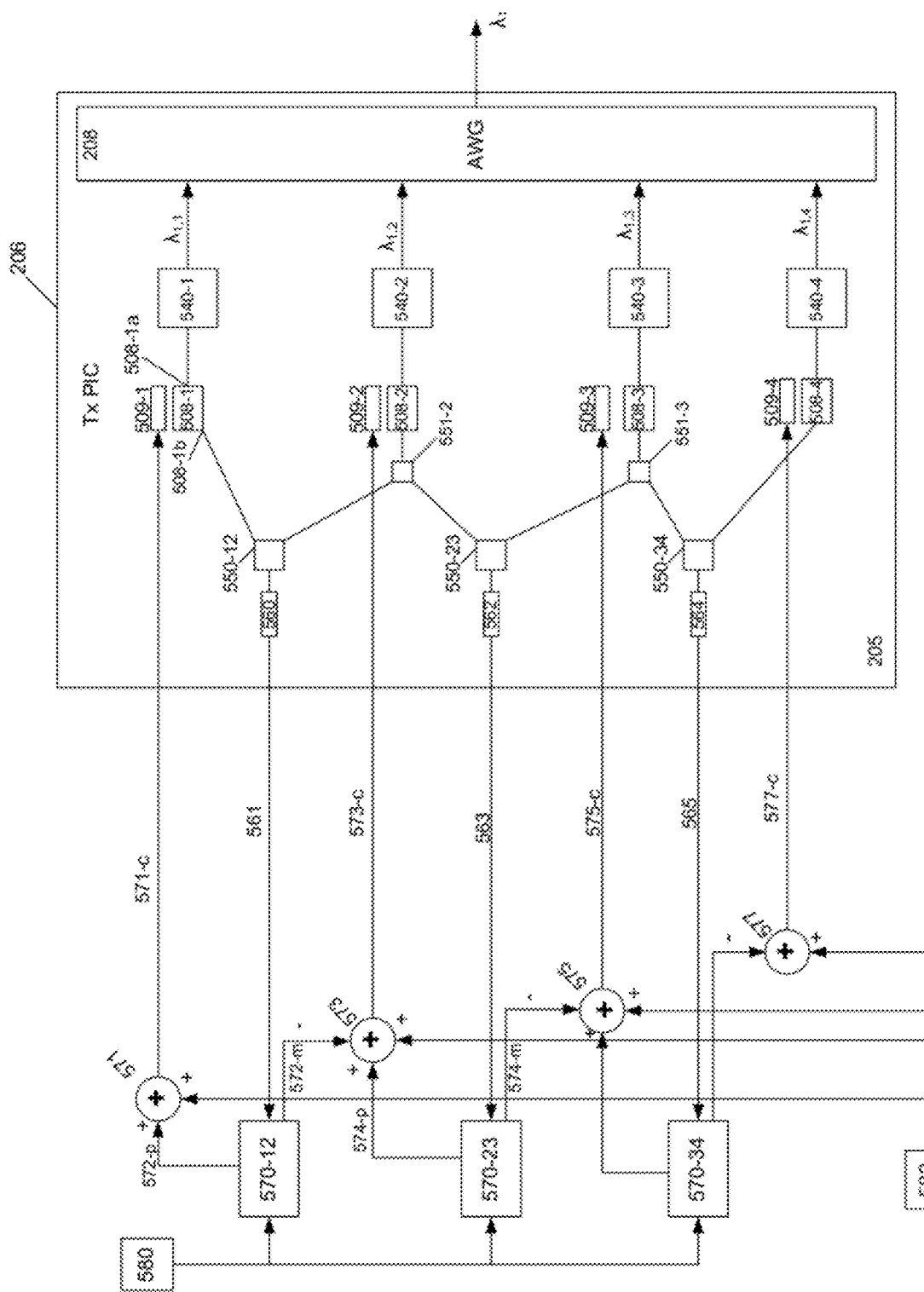
FIG. 5a illustrates a laser control circuit consistent with an aspect of the present disclosure.

FIG. 5a illustrates an exemplary embodiment consistent with the present disclosure for controlling a plurality of lasers such as DFB 508 in FIG. 4 to provide a plurality of carriers at precise wavelengths and with a precise frequency spacing between the carriers. The embodiment shown in FIG. 5a illustrates a transmit PIC 206 as described above with respect to FIGS. 3 and 4. For simplicity, the exemplary embodiment in FIG. 5a is illustrated using four DFB lasers 508-1 to 508-4, providing a total of four carriers which are combined using an AWG 208, for example. It is understood that the present disclosure is not limited to four carriers, and that the functionality and methodology described herein could be implemented with any number of carriers according to a specific embodiment.

Each laser 508-1 to 508-4 is coupled to a modulation circuit 540-1 to 540-4, respectively. Each modulation circuit 540-1 to 540-4 is preferably configured to provide a corresponding modulated output at a respective one of desired wavelengths $\lambda 1,1$ to $\lambda 1,4$ according to the embodiment shown in FIG. 4 as discussed above. Each DFB laser 508-1 to 508-4 has a nominal wavelength corresponding to the pass-band of a port of AWG 208 to which it is connected. Each DFB laser is controlled to provide an optical signal having a corresponding one of desired wavelengths $\lambda 1,1$ to $\lambda 1,4$. In one example, lasers 508-1 to 508-4 may be temperature tuned using a corresponding tuning circuit or heater 509-1 to 509-4, respectively, which operate to alter the temperature of each DFB laser, and thus the wavelength of the optical signal output from each laser, according to a control signal. The wavelength of light output from each DFB laser 508-1 to 508-4 may be precisely controlled or tuned according to calculated changes in temperature of each DFB laser source. Accordingly, the exemplary embodiment functions to provide an appropriate control signal to precisely tune each DFB laser 508-1 to 508-4 to provide a light signal of a desired wavelength or frequency, e.g., at a corresponding one of desired wavelengths $\lambda 1,1$ to $\lambda 1,4$. Additionally, the DFB lasers 508-1 to 508-4 are tuned with respect to each other to maintain a desired frequency spacing between adjacent carriers, as discussed in greater detail below.

In one embodiment, the plurality of DFB lasers 508-1 to 508-4 are controlled to operate at wavelengths separated by a substantially fixed or periodic spacing as shown and described above with respect to FIG. 1b. Accordingly, the exemplary embodiments maintain a desired spacing between each carrier by measuring and controlling a frequency error between the output of a pair of lasers providing adjacent carriers. With respect to FIG. 1b, $\lambda 1,1$ and $\lambda 1,2$ are considered to be adjacent carriers because their respective frequencies are adjacent within the band of frequencies provided in superchannel SC1. As shown in FIG. 5a, adjacent carriers $\lambda 1,1$ and $\lambda 1,2$ may correspond to outputs from DFB laser 508-1 and 508-2, respectively, that are also physically adjacent on substrate 205 of PIC 206 as shown, although in practice, the lasers 508-1 and 508-2 may be provided in any suitable arrangement.

Each of the DFB lasers 508-1 to 508-4 may be configured such that a light signal is output from a first and second end of the laser device. The first end of each laser 508-1 to 508-4 provides a light signal to one of the modulation circuits 540-1 to 540-4, respectively. The other end of each laser 508-1 to 508-4 is used to calculate a frequency difference between that laser and the output of a laser providing an adjacent wavelength. As shown in FIG. 5a, a first output from a first end 508-1a of laser 508-1 is provided to modulation circuit 540-1 which modulates the light signal according to a modulation format, and outputs the modulated signal as a carrier having wavelength $\lambda 1,1$ to an AWG 208 for multiplexing with the other carriers $\lambda 1,2$ to $\lambda 1,4$. The second end 508-1b of laser 508-1 is provided to a coupler 550-12, such as a 2:1 coupler for example, which couples or combines the 508-1b output of laser 508-1 with a portion of the output of a second end 508-2*b* of a second laser 508-2, which corresponds to an adjacent carrier. The 508-2*b* output is split using a splitter 551-2 to provide one portion of the output to coupler 550-12 and a second portion of the output signal to coupler 550-23. In this manner, the 508-2*b* output of laser 508-2 may be compared with an output of two "adjacent" lasers 508-1 and 508-3, i.e., lasers supplying light at wavelengths adjacent to the wavelength of light output from laser 508-2, using similar techniques described below. The functionality of PIN photodiodes 562, 564, couplers 550-23, 550-34, splitter 551-3, adders 575, 577 and heaters 509-3 and 509-4 are understood to be the same or similar as the related components discussed below.

Figure 5B:
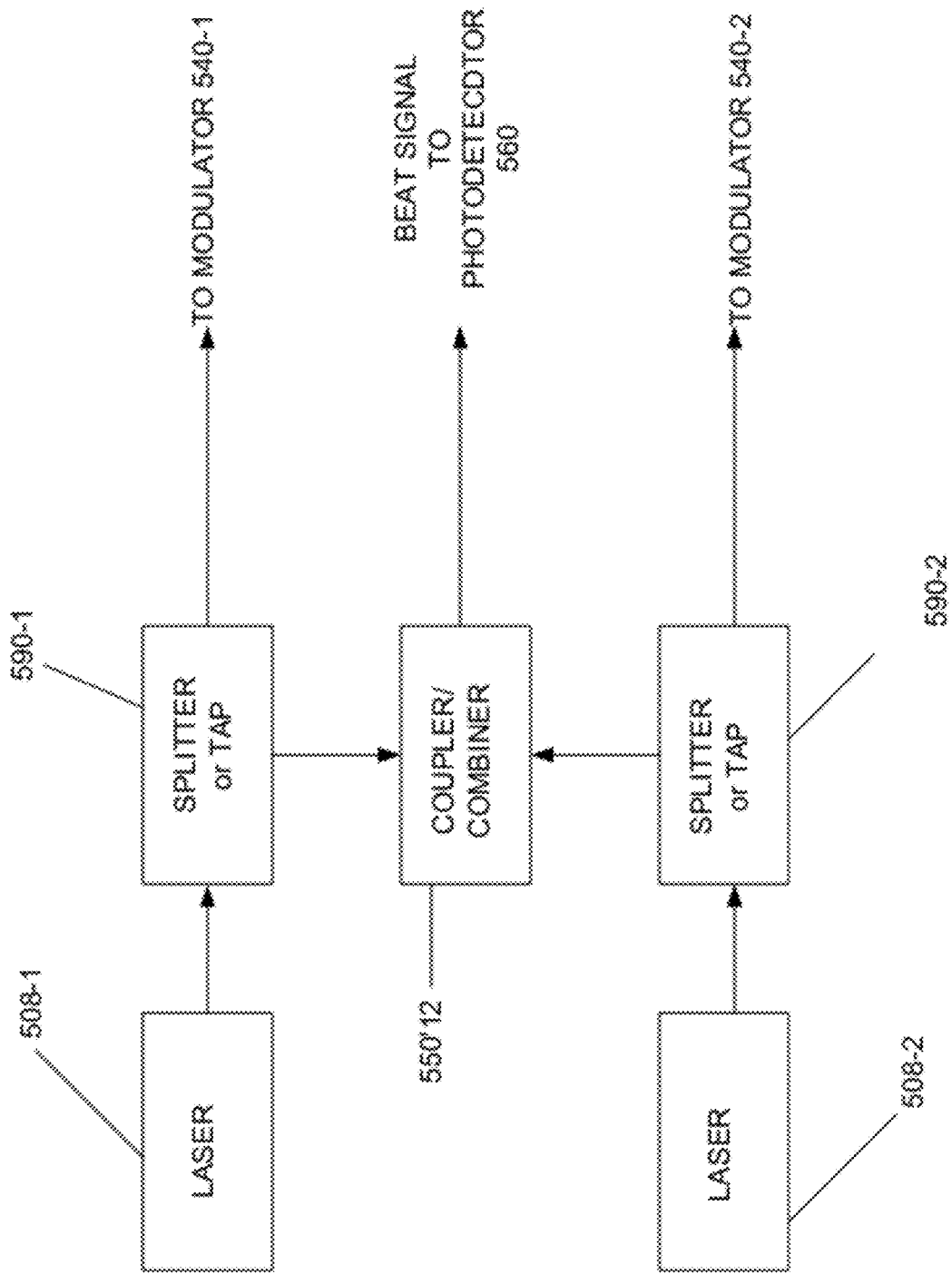
FIG. 5b illustrates a portion of a laser control circuit consistent with another aspect of the present disclosure.

In another embodiment shown in FIG. 5*b*, each laser 508-1 and 508-2, for example, may have a single output from either end or a combined output from both ends provided as a single light signal. As shown, an output light signal from laser 508-1 is provided to a splitter or tap 590-1 that splits the incoming light signal into a first and second portion of the light signal. The first and second portions of the light signal may be lower amplitude portions of the incoming light signal. A first portion of the light signal is provided to modulator 540-1, which functions similarly as above, whereas the second portion of the light signal is provided to a combiner or coupler 550'-12. The single light signal output from a second laser 508-2 is provided to a second splitter or tap 590-2 that similarly splits the incoming light signal into a first and second portion of the incoming light signal. The first portion of the light signal is provided to modulator 540-2, whereas the second portion of the light signal is provided to combiner 550'-12. Combiner 550'-12 optically combines the second light portions of each of the light signal from lasers 508-1 and 508-2 as shown. The output of combiner or coupler 550'-12 is a combined signal with a beat frequency that is detected in the photodetector 560, as similarly discussed above with respect to FIG. 5*a*.

Each of the outputs of lasers 508-1 to 508-4 has substantially the same polarization. Thus, as the outputs or light signals of any two lasers having adjacent wavelengths are combined, the combined instantaneous optical power of the two light signals can produce a waveform with a frequency corresponding to a difference between the frequencies of the two combined signals. Such a phenomenon is well known. The combined signal may be referred to as a beat signal, and the frequency of the beat signal is referred to as a beat frequency. Accordingly, coupler 550-12 may output a beat signal with a beat frequency that indicates the difference in frequency between the output of laser 508-1 and laser 508-2. The combined optical signal of coupler 550-12 is then detected by a PIN photodiode 560 which provides an electrical signal 561 that oscillates at the beat frequency. Alternatively, a balanced detector may be provided to detect the outputs of lasers 508-1 and 508-2. This beat frequency, when the difference in frequency between outputs of lasers 508-1 and 508-2 is at a desired value, is preferably substantially the same as the desired carrier spacing between carrier λ1,1 and λ1,2. Any differences between the beat frequency and the desired channel or carrier spacing can be determined or measured and controlled in one of a plurality of locking circuits 570-12, 570-23 and 570-34, as shown.

Locking circuit 570-12 receives the electrical signal 561 which indicates a frequency difference between lasers 508-1 and 508-2. Locking circuit 570-12 functions to measure a frequency offset or error between the beat frequency of signal 561 and the desired frequency difference indicative of the desired carrier spacing between adjacent carriers λ1,1 and λ1,2. Any measured or determined frequency error is then used to tune one or both of the lasers 508-1 and 508-2 to reduce or minimize the frequency error to zero. Locking circuit 570-12, according to one embodiment, is described with respect to FIG. 6*a*. It is understood that locking circuits 570-23 and 570-34 function the same or similarly as that described below with respect to locking circuit 570-12.

Figure 6A:
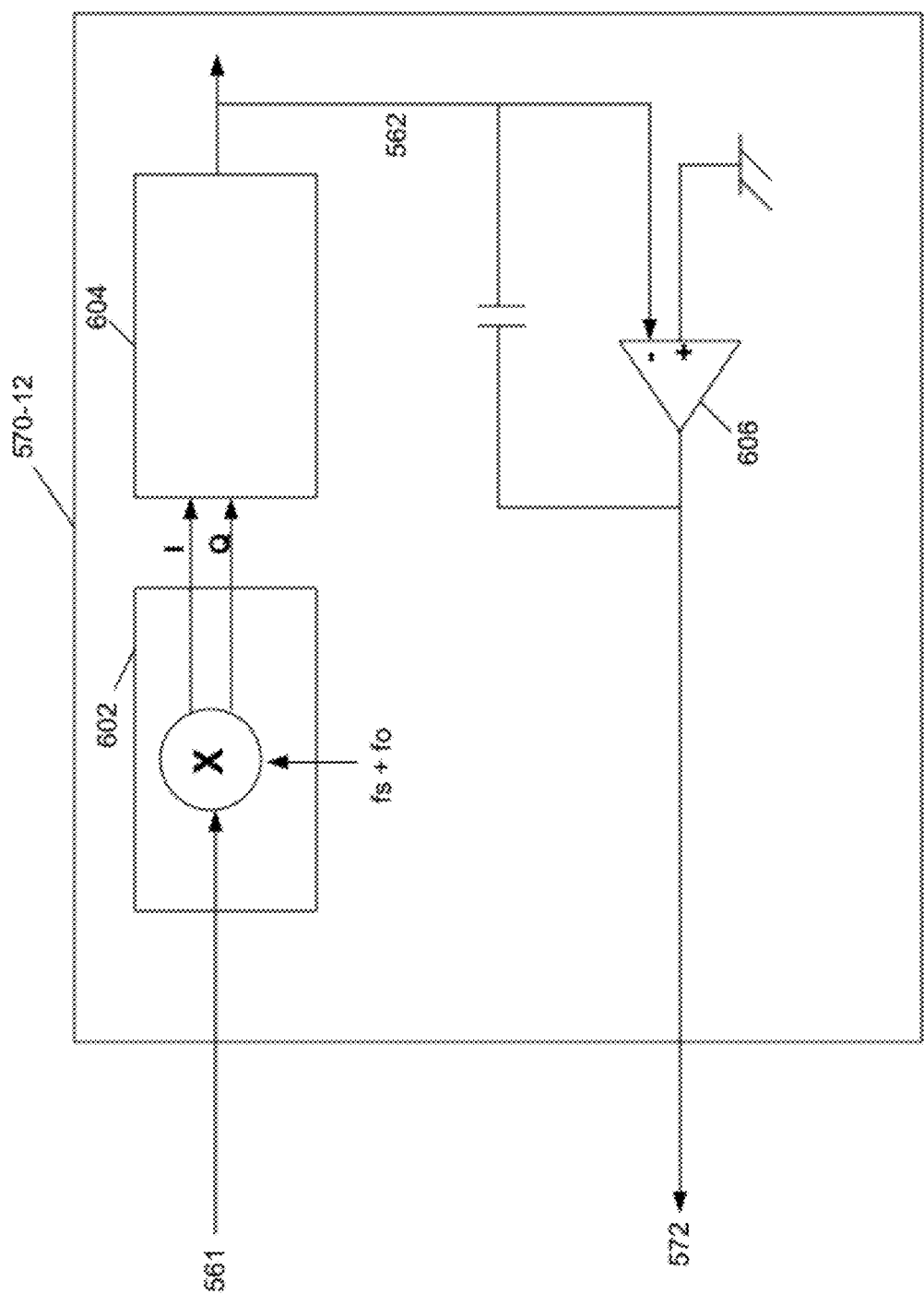
FIGS. 6a, 6b and 6c illustrate aspects of a locking circuit provided in the laser wavelength control circuit of FIG. 5.

As shown in FIG. 6*a*, signal 561 is input into a quadrature multiplier 602 which down-converts signal 561 into a baseband in-phase (I) and quadrature phase (Q) signal. Signal 561 is down-converted to baseband according to a target reference frequency signal represented by a composite value "fs+fo". The target reference frequency value (fs+fo) in this embodiment is representative of the desired frequency spacing between adjacent carriers. The value 'fs' represents the symbol frequency or the frequency spacing indicative of the symbol rate or baud rate of the individual carriers. The value 'fo' represents a frequency offset that is preferably a small percentage of the symbol rate, such as less than 10 percent, for example. In one embodiment, the value of 'fo' is determined based on desired performance in the system and is such that electronic filtering components used in the transmit node N1 (in this example) and receive node N2 enable the reliable processing and demultiplexing of such closely spaced carriers in the receive node.

Figure 6B:
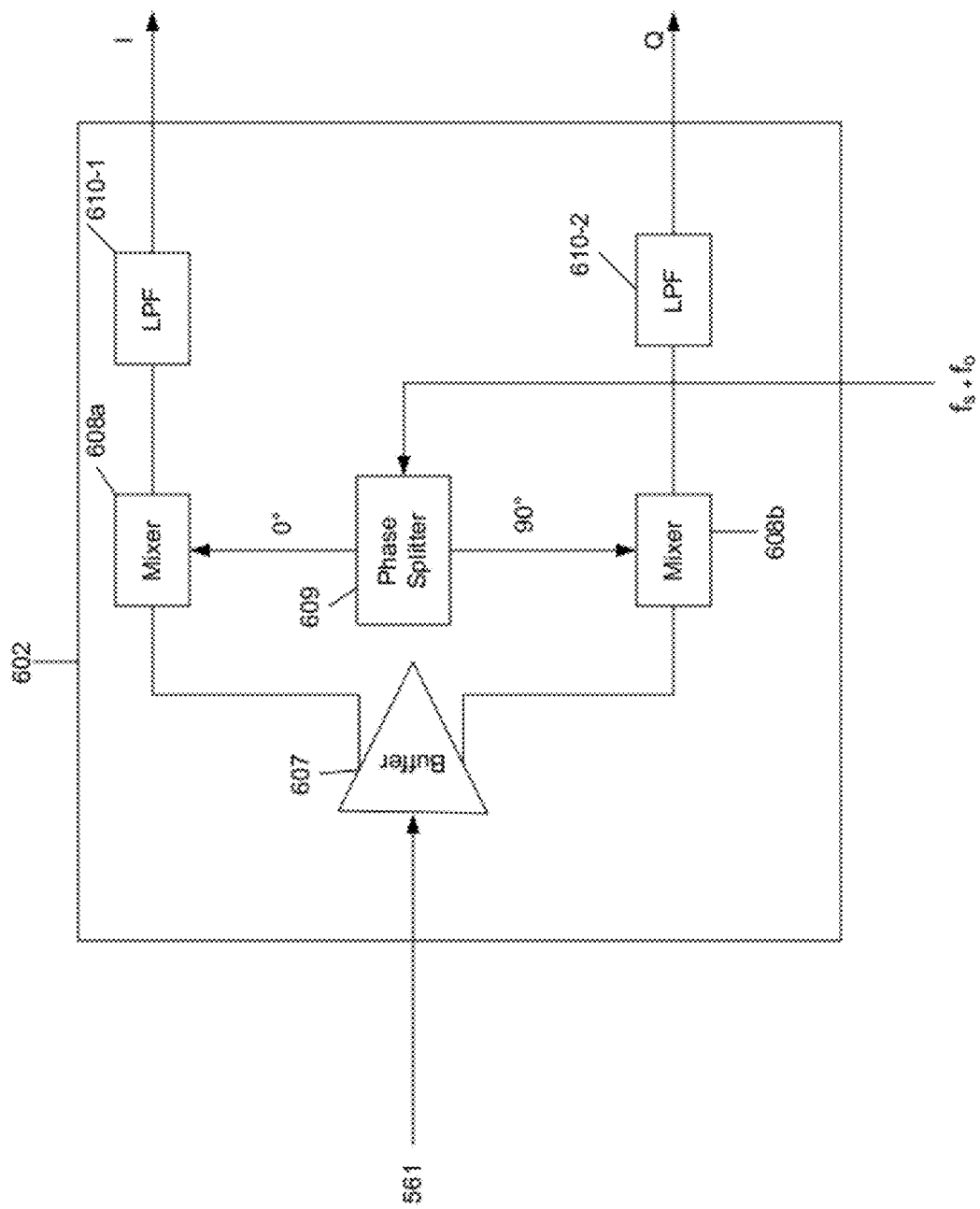

As shown in FIG. 6*b*, quadrature multiplier 602 includes a buffer amplifier 607 that provides signal 561 to a pair of mixers 608*a* and 608*b*. Mixer 608*a* combines signal 561 with an in-phase (I) component of the target reference frequency (fs+fo) output from a phase splitter 609, and mixer 608*b* combines signal 561 with a quadrature phase component of the target reference frequency (fs+fo) output from the phase splitter 609. The output of mixers 608*a* and 608*b* are then provided to low pass filters 610-1 and 610-2 which output the baseband in-phase (I) and quadrature (Q) components of the down-converted signal 561. The I and Q components of the down-converted signal 561 are then provided to a baseband frequency discriminator circuit 604, shown in greater detail in FIG. 6*c*.

Figure 6C:
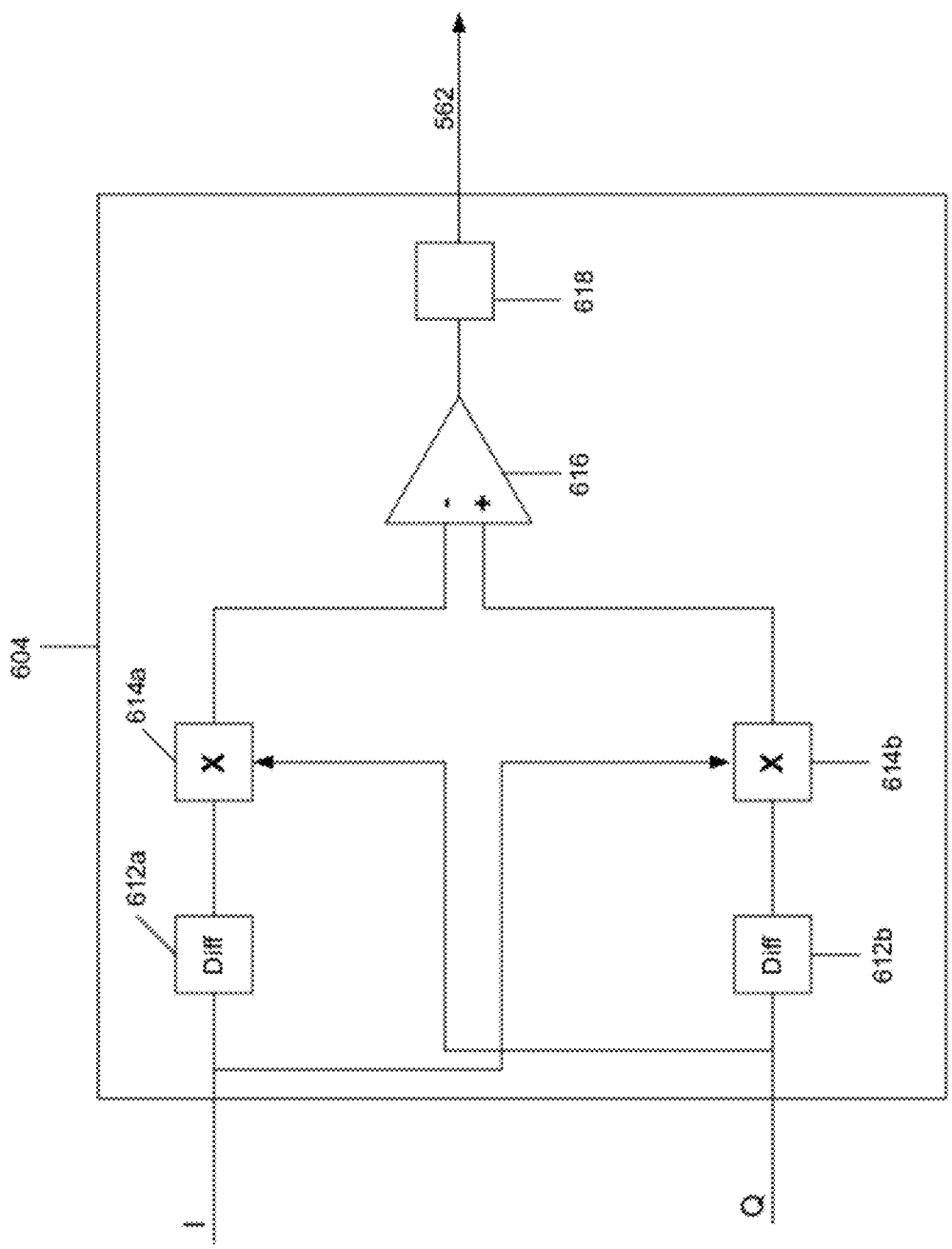

As shown in FIG. 6*c*, an exemplary baseband frequency discriminator 604 includes a pair of differentiators 612*a*, 612*b* and a pair of multipliers 614*a*, 614*b*. The differentiator 612*a* receives the baseband in-phase component (I) of the down-converted beat frequency signal 561 and produces a time differential signal dI/dt which is then supplied to multiplier 614*a* to be multiplied with the quadrature phase component (Q) of the beat frequency signal 561 to produce a value of Q*dI/dt. Differentiator 612*b* produces a time differential signal dQ/dt that is then output to multiplier 614*b* to be multiplied with the in-phase (I) component to produce a value I*dQ/dt. Each of the outputs from multipliers 614*a* and 614*b* are then supplied to a differential amplifier 616 which produces a signal at its output that is proportional to the difference between Q*dI/dt and I*dQ/dt. The output is then filtered with a low pass filter 618, to provide a frequency error signal 562 that is indicative of the frequency offset or error between the input signal 561 and the target reference frequency (fs+fo).

The frequency error signal 562 output from the baseband frequency discriminator 604 is then used to tune one or both of lasers 508-1 and 508-2 according to the detected frequency error. The output frequency error provides an absolute value of the frequency error. From this value alone, however, it may difficult to determine whether the frequency error is greater than the target reference frequency by the absolute value or less than the target reference frequency by the absolute value. The sign of the frequency error can be determined based on the direction of rotation of the I and Q signals. Thus, the frequency error signal can be observed to determine the sign of the error to enable effective control of the frequency error. Furthermore, the frequency error signal 562 is controlled in the locking circuit 570-12 by means of a loop amplifier 606 which functions as an integrator to output an integrated value of the error signal 562 over a period of time. Thus, the output 572 of the loop amplifier 606 can be used to control lasers 508-1 and 508-2 to minimize or reduce the average frequency error in signal 562 to zero. The output of loop amplifier 606 may be used to determine which laser or lasers 508-1 and 508-2 should be adjusted and by how much in order to achieve a frequency error of zero between the outputs of lasers 508-1 and 508-2.

Locking circuit 570-12 provides a control signal to one or both of adders 571 and 573 shown in FIG. 5a. Based on the integrated frequency error signal 572, the locking circuit 570-12 determines whether and or by how much to increase the frequency of the signal output from laser 508-1 or decrease the frequency of the signal output from laser 508-2. As further shown in FIG. 5a, adder 571 is provided with a plus (+) input for receiving a control signal 572-$p$ from locking circuit 570-12. The plus input control signal 572-$p$ affects a change in the control signal 571-$c$ output from adder 571. Control signal 571-$c$ is used to control heater 509-1, corresponding to laser 508-1, to adjust the temperature of laser 508-1 to realize a corresponding increase or decrease in the frequency of the output signal of laser 508-1. Additionally, a minus (−) input of adder 573 receives minus input control signal 572-$m$ from locking circuit 570-12 which affects control signal 573-$c$ and causes heater 509-2 to adjust the temperature of laser 508-2 to realize a corresponding increase or decrease in the frequency of the output from laser 508-2. In one embodiment, the plus input control signal 572-$p$ and the minus (−) input control signal 572-$m$ are the same control signal 572 output from locking circuit 570-12, as shown in FIG. 6a. In this manner, control signal 572 may have a corresponding voltage or current that effects the same relative change to the output of laser 508-1 and 508-2. This process will continue iteratively until a frequency error of zero or substantially equal to zero is achieved between lasers 508-1 and 508-2. Each iteration preferably produces an incremental change in the frequency error between respective laser outputs that can be further minimized or reduced to zero.

Additionally, as shown in FIG. 5a, the control signal 573-$c$ is also affected by a plus input control signal 574-$p$ received from locking circuit 570-23 that controls the frequency difference between the outputs of lasers 508-2 and 508-3 in the same or similar manner to that described above with respect to locking circuit 570-23. Accordingly, based on the frequency error between the outputs of lasers 508-2 and 508-3, control signal 573-$c$ control heater 509-2 of corresponding laser 508-2 to adjust the output of laser 508-2 such that the frequency error between laser 508-1 and 508-2 is also affected. However, because the above processes are performed iteratively within each locking circuit 570-12, 570-23 and 570-34, each of the lasers can be stabilized such that the frequency errors between adjacent carriers output from respective lasers can each be minimized or reduced to zero. After, or prior to, a frequency error is reduced to zero between each pair of the lasers 508-1 to 508-4 providing adjacent carriers, the output of each laser 508-1 to 508-4 may be controlled to shift in frequency with respect to a common superchannel control signal output from module 582. As shown, the output from module 582 is provided to each adder 571, 573, 575, and 577, to effect a common frequency shift for each of the lasers 508-1 to 508-4. The common frequency shift may function to align each of the wavelengths or frequencies of the outputs associated with each of lasers 508-1 to 508-4 to a desired frequency grid unique to a specific embodiment, or with respect to the ITU grid.

In accordance with this disclosure, an exemplary embodiment is described for controlling a plurality of lasers 508-1 to 508-4 to provide carriers with wavelengths λ1,1, λ1,2, λ1,3 and λ1,4 with a fixed or periodic frequency spacing. As shown in FIG. 5a, a frequency difference between each pair of lasers, e.g., laser pair 508-1 and 508-2, providing adjacent carriers is measured or determined such that the desired carrier spacing can be reliably controlled between each pair of adjacent carriers. The described embodiment is an improvement over systems that are incapable of determining or controlling the frequency spacing between adjacent carriers, or those that measure an average carrier spacing distributed between a plurality of adjacent channels. As discussed above, even a slight frequency error may be intolerable in an exemplary system that utilizes a plurality of very closely spaced carriers in a superchannel, for example. Thus, it is advantageous to precisely measure and control any frequency errors between adjacent carriers. The above embodiments depict four lasers 508-1 to 508-4 for providing four carriers, λ1,1, λ1,2, λ1,3 and λ1,4, and three locking circuits 570-12, 570-23, and 570-34 for measuring the frequency error between the outputs of each adjacent laser. In the exemplary embodiments, any desired number of carriers may be provided in a superchannel. As such, for any N carriers provided, the exemplary embodiment preferably utilizes N−1 locking circuits to calculate the N−1 frequency differences between adjacent carriers.

In the embodiment shown in FIGS. 6a, 6b and 6c, the respective frequency error between adjacent carriers is determined with respect to a common target reference frequency (fs+fo) such that the frequency spacing between the outputs of a plurality of lasers 508-1, 508-2, 508-3 and 508-4 is fixed or periodic. The target reference frequency (fs+fo) in this embodiment is provided by a channel spacing clock 580, as shown in FIG. 5. Channel spacing clock 580 may be a voltage controlled oscillator configured to provide a clock signal with a frequency corresponding to the desired channel spacing between each of the adjacent carriers output from PIC 206.

In the exemplary embodiments, it is preferred that each PIC 206 is capable of supporting a plurality of modulation formats and a plurality of carrier or channel plans. The data rate of each carrier in the superchannel depends in part on the modulation format and symbol rate utilized for that carrier. In some embodiments, it is desirable to provide a carrier with a constant data rate regardless of the modulation format utilized for the carrier. Thus, in one embodiment, the baud rate of the individual carriers λ1,1, λ1,2, λ1,3 and λ1,4 may vary according to the modulation format in order to maintain a constant data capacity. Accordingly, the fixed or periodic spacing between carriers λ1,1, λ1,2, λ1,3 and λ1,4 may also change according to the selected modulation format. As such, PIC 206 is configured to measure and control the fixed periodic spacing between adjacent carriers according to any specific carrier or channel plan, regardless of a change in symbol rate or baud rate. The channel spacing clock 580 is preferably controlled to provide a target reference frequency according to a plurality of modulation formats and carrier arrangements utilized in the superchannel.

Figure 7:
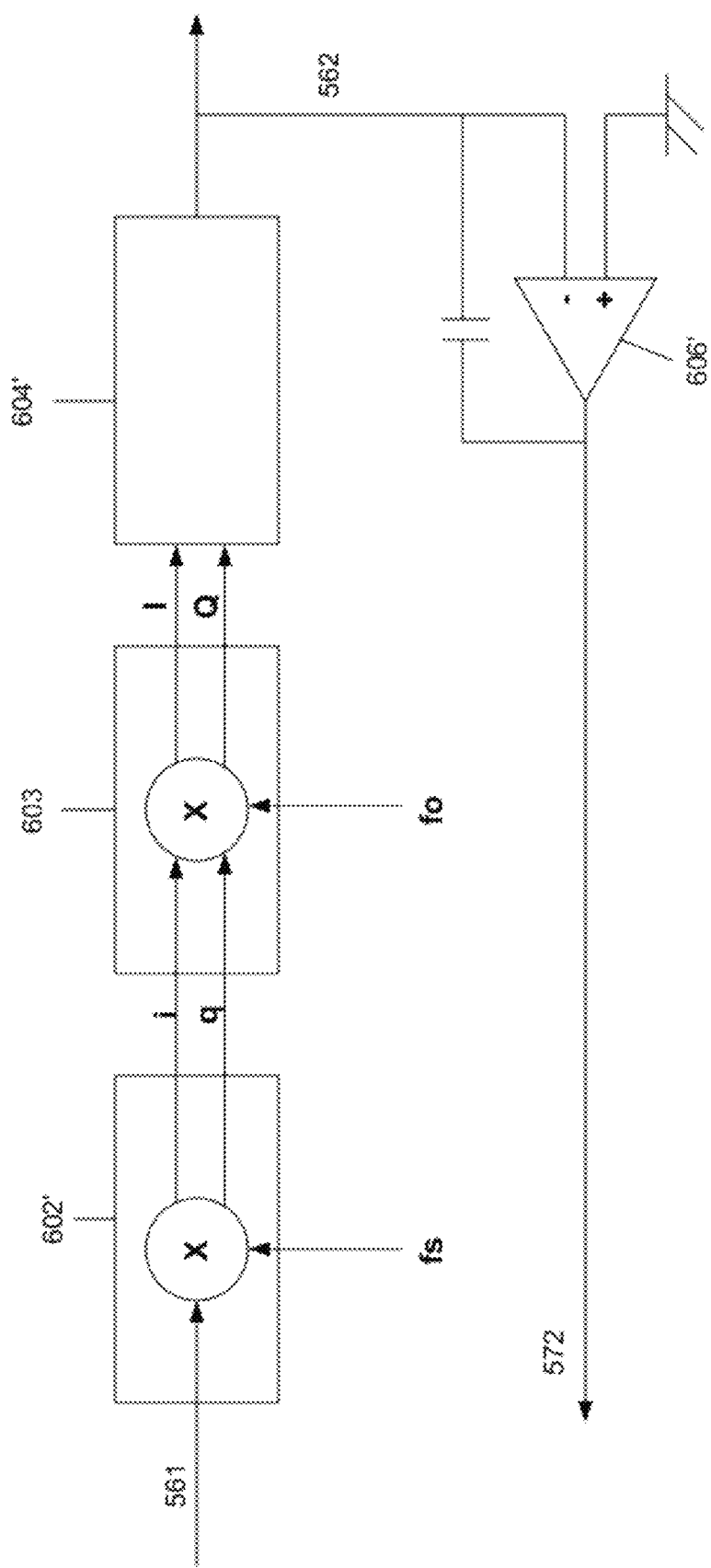
FIG. 7 illustrates an additional aspect of a locking circuit consistent with an aspect of the present disclosure.

In another embodiment, shown in FIG. 7, the beat frequency signal 561 detected by the combined output from lasers 508-1 and 508-2 may first be down-converted in quadrature multiplier circuit 602' to a lower frequency with respect to a symbol rate or baud rate reference frequency 'fs' provided from a symbol rate clock, for example. The frequency spacing between adjacent wavelengths depends in part on the bandwidth of the carriers, which is determined in part by the symbol rate or baud rate of the carrier. Thus, it is convenient to use such a symbol rate clock to down-convert the beat frequency signal 561. Accordingly, in the alternative embodiment shown in FIG. 7, the output of quadrature multiplier 602' may be an in-phase 'i' component and a quadrature 'q' component at the down-converted frequency 'fs'. The quadrature multiplier 602' preferably functions similar to quadrature multiplier 602 shown in FIG. 6b. Because the carriers are preferably spaced apart by an additional amount, such as a percentage of the baud rate, the beat frequency signal may be further down-converted. A second complex multiplier 603 is then provided to further down-convert the 'i' and 'q' signals output from quadrature multiplier 602' with respect to a frequency offset reference 'fo' that indicates a desired frequency difference between the beat signal 561 and the symbol rate reference frequency 'fs'. The frequency offset reference signal 'fo' may be provided by a separate voltage controlled oscillator (not shown). A baseband in-phase 'I' component and a baseband quadrature 'Q' component are output from complex multiplier 603 and input to baseband frequency discriminator 604' that functions similar to baseband frequency discriminator 604 shown in FIG. 6c. As before, baseband frequency discriminator 604' outputs a frequency error signal 562 that is controlled using loop amplifier or integrator 606' and is then used to set a frequency difference between the corresponding outputs of lasers 508-1 and 508-2.

While the above embodiments are described as being implemented in analog components as shown in FIGS. 6a, 6b and 6c, each of the above embodiments may be implemented using digital components or a combination of digital and analog components. For example, quadrature multiplier 602' may be implemented in an analog circuit to produce 'i' and 'q', which may then be digitized to be processed using digital signal processing techniques performed in a digital complex multiplier 603 and a digital baseband frequency discriminator 604'.

Figure 8:
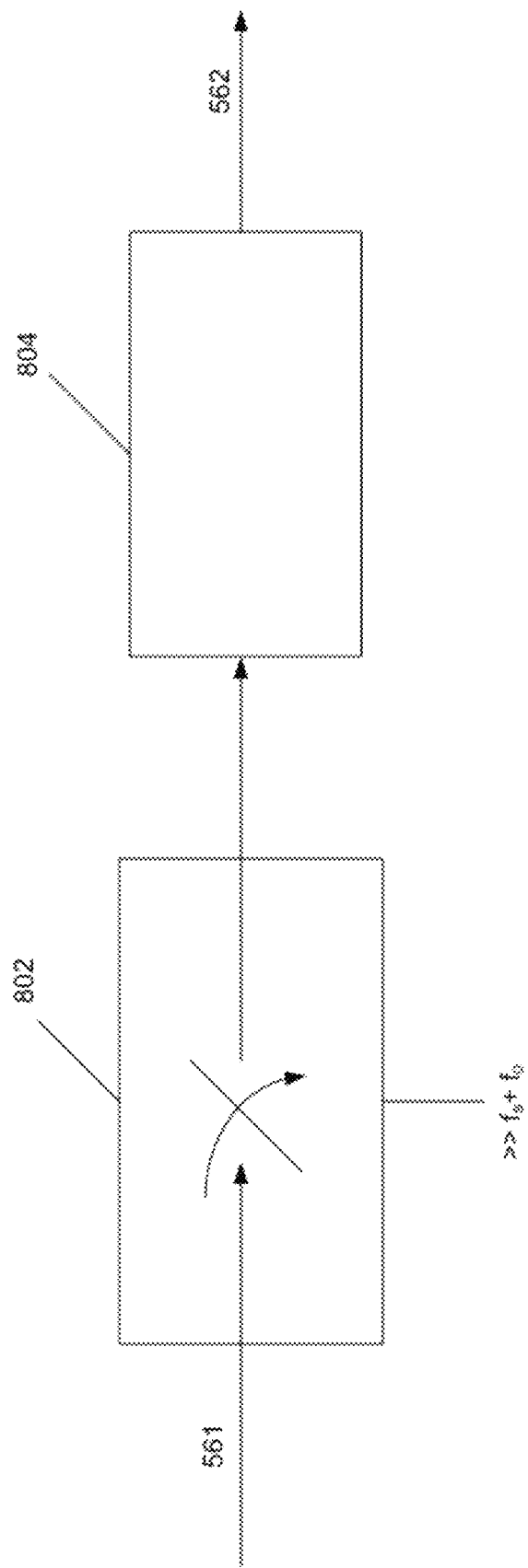
FIG. 8 illustrates an additional aspect of a locking circuit consistent with another aspect of the present disclosure.

In some embodiments, the quadrature multiplier 602 or 602' may be substituted with a sampling circuit 802 shown in FIG. 8, that samples the beat frequency signal 561 at a desired sampling rate, such as at a sampling rate higher than a target reference frequency 'fs+fo'. The sampled signal may then be processed using a low pass filter 804 or other known digital circuits to provide the frequency error signal 562. Additionally, in one embodiment, quadrature multiplier 602 or 602' may be substituted with a complex multiplier. In this case, however, a potential ambiguity may arise due to the inability to distinguish the sign of the error signal. In an analogous sampled system, the beat frequency signal 561 may be sampled using sampler 802, for example, except at a sampling rate substantially the same as the sample rate or baud rate 'fs' for each of the carriers. Such a method is also complicated due to the above ambiguity in distinguishing the sign of the error signal.

In the above embodiments, each of optical detectors 560, 562, and 564 include PIN photodiodes. It is noted, however, that such PIN photodiodes may be substituted with a known optical quadrature demodulator, having an in-phase (I) and a quadrature (Q) output provided to locking circuits 570-12, 570-23, and 570-34, respectively.

In yet another embodiment, a phase error may be measured from the beat frequency output from the PIN photodiodes 560, 562 and 564. In this case, a phase locked loop can be implemented with a narrow bandwidth due to the time constant for controlling the laser tuning mechanism, such as heaters 509-1 to 509-4. Additionally, the phase noise on the beat frequency may be high, thus it may be necessary to divide down the beat frequency so that the phase jitter on the divided signal is less than 1 radian root mean squared, for example. The beat phase may then be used to calculate an error between two adjacent laser outputs with respect to a target reference frequency.

As discussed in the above embodiments, the combined outputs of lasers supplying optical signals having adjacent wavelengths or frequencies are measured or determined to control a frequency error between such adjacent wavelengths with respect to a target reference frequency. In one embodiment, the transmit PIC 206 shown in FIG. 5, may be configured to compare the outputs of every other laser, such as those providing adjacent odd numbered carriers. In other words, the outputs of lasers 508-1 and 508-3 may be measured and compared to determine an error between the combined outputs and a target reference frequency that is two-times the individual carrier spacing, for example. Additionally, the output of even numbered lasers 508-2 and 508-4 may similarly be combined and measured to determine a relative frequency error. Each of the lasers 508-1 to 508-4 may then be controlled according to the above embodiments to minimize or reduce the relative errors to zero according to the above embodiments.

Other embodiments will be apparent to those skilled in the art from consideration of the specification. It is intended that the specification and examples be considered as exemplary only, with a true scope and spirit of the invention being indicated by the following claims.

What is claimed is:

1. A method comprising:
 combining a first optical signal having a first frequency with a second optical signal having a second frequency, the first and second optical signals being ones of a plurality of optical signals grouped together as a channel;
 determining a first frequency difference between the first and second frequencies;
 determining a second frequency difference between the first difference and a reference frequency;
 determining whether to adjust one or both of the first and second optical sources according to the second frequency difference; and
 adjusting at least one of the first and second frequencies based on the determined second frequency difference, wherein said determining the second frequency difference includes a step of down-converting an electrical signal having the beat frequency with a signal having the reference frequency.

2. The method of claim 1, wherein said determining the first frequency difference includes a step of identifying a beat frequency of a combined signal including the first optical signal and the second optical signal.

3. A method comprising:
 combining a first optical signal having a first frequency with a second optical signal having a second frequency, the first and second optical signals being ones of a plurality of optical signals grouped together as a channel;
 determining a first frequency difference between the first and second frequencies;
 determining a second frequency difference between the first difference and a reference frequency;
 determining whether to adjust one or both of the first and second optical sources according to the second frequency difference; and
 adjusting at least one of the first and second frequencies based on the determined second frequency difference, wherein said determining the second frequency difference includes a step of down-converting an electrical signal having the beat frequency with a first down-convert signal and a second down-convert signal.

4. A method comprising:

combining a first optical signal having a first frequency with a second optical signal having a second frequency, the first and second optical signals being ones of a plurality of optical signals grouped together as a channel;

determining a first frequency difference between the first and second frequencies;

determining a second frequency difference between the first difference and a reference frequency;

determining whether to adjust one or both of the first and second optical sources according to the second frequency difference; and adjusting at least one of the first and second frequencies based on the determined second frequency difference, wherein the adjusting step further comprises controlling the first and second frequencies with a common control signal, the common control signal being based on the second frequency difference.

5. A method comprising:

combining a first optical signal having a first frequency with a second optical signal having a second frequency, the first and second optical signals being ones of a plurality of optical signals grouped together as a channel;

determining a first frequency difference between the first and second frequencies;

determining a second frequency difference between the first difference and a reference frequency;

determining whether to adjust one or both of the first and second optical sources according to the second frequency difference;

adjusting at least one of the first and second frequencies based on the determined second frequency difference; and adjusting the first and second frequencies according to a common frequency control signal.

6. An apparatus comprising:

N optical sources configured to supply N corresponding optical signals having N respective frequencies, wherein the N optical signals form a superchannel, where N is an integer greater than 1;

N−1 locking circuits configured to determine N−1 respective differences in frequency between adjacent optical signals output from corresponding N−1 pairs of the N optical sources, the N−1 locking circuits each further configured to determine N−1 first frequency differences between the N−1 respective frequency differences;

N tuning circuits corresponding to N respective optical sources, each configured to adjust an output of the corresponding optical source according to the N−1 respective determined first frequency differences; and a common frequency module configured to provide a common frequency signal to each of the N tuning circuits, the common frequency signal adjusting an output of each the N optical sources.

7. The apparatus of claim 6, wherein the N optical sources are provided on a substrate.

* * * * *